United States Patent
Eddy (10) Patent No.: US 9,898,418 B2
(45) Date of Patent: Feb. 20, 2018

(54) PROCESSOR INCLUDING SINGLE INVALIDATE PAGE INSTRUCTION

(71) Applicant: VIA ALLIANCE SEMICONDUCTOR CO., LTD., Shanghai (CN)

(72) Inventor: Colin Eddy, Austin, TX (US)

(73) Assignee: VIA ALLIANCE SEMICONDUCTOR CO., LTD., Shanghai (CN)

( * ) Notice: Subject to any disclaimer, the term of this patent is extended or adjusted under 35 U.S.C. 154(b) by 358 days.

(21) Appl. No.: 14/718,201

(22) Filed: May 21, 2015

(65) Prior Publication Data

US 2016/0342524 A1 Nov. 24, 2016

(51) Int. Cl.
*G06F 12/00* (2006.01)
*G06F 12/1027* (2016.01)
*G06F 12/0815* (2016.01)
*G06F 12/0891* (2016.01)

(52) U.S. Cl.
CPC ...... *G06F 12/1027* (2013.01); *G06F 12/0815* (2013.01); *G06F 12/0891* (2013.01); *G06F 2212/621* (2013.01); *G06F 2212/683* (2013.01)

(58) Field of Classification Search
None
See application file for complete search history.

(56) References Cited

U.S. PATENT DOCUMENTS

| | | | |
|---|---|---|---|
| 2004/0068618 A1* | 4/2004 | Hooker | G06F 9/3812 711/141 |
| 2006/0004944 A1* | 1/2006 | Vij | G06F 12/1491 711/6 |
| 2015/0100753 A1* | 4/2015 | Shen | G06F 12/1027 711/207 |
| 2015/0242319 A1* | 8/2015 | Evans | G06F 12/0833 711/207 |

* cited by examiner

*Primary Examiner* — Daniel D Tsui
*Assistant Examiner* — Craig S Goldschmidt
(74) *Attorney, Agent, or Firm* — McClure, Qualey & Rodack, LLP (57) ABSTRACT

A processor including a translation lookaside buffer (TLB), an instruction translator, and a memory subsystem. The TLB caches virtual to physical address translations. The instruction translator incorporates a microinstruction set for the processor that includes a single invalidate page instruction. The invalidate page instruction, when executed by the processor, causes the processor to perform a pseudo translation process in which a virtual address is submitted to the TLB to identify matching entries in the TLB that match the virtual address. The memory subsystem invalidates the matching entries in the TLB. The TLB may include a data TLB and an instruction TLB. The memory subsystem may include a tablewalk engine that performs a pseudo tablewalk to invalidate entries in the TLB and in one or more paging caches. The invalidate page instruction may specify invalidation of only those entries indicated as local.

17 Claims, 3 Drawing Sheets

PROCESSOR INCLUDING SINGLE INVALIDATE PAGE INSTRUCTION

BACKGROUND OF THE INVENTION

Field of the Invention

The present invention relates in general to page invalidation performed by a processor, and more particularly to a processor with a single invalidate page instruction for invalidating matching translation lookaside buffer and paging cache entries.

Description of the Related Art

Modern processors support virtual memory capability. A virtual memory system maps, or translates, virtual (a.k.a., "linear") addresses used by a program to physical addresses used by hardware to address system memory. Virtual memory provides the advantages of hiding the fragmentation of physical memory from the program and facilitating program relocation. Virtual memory thus allows the program to see a larger memory address space than the actual physical memory available to it. These advantages are particularly beneficial in modern systems that support time-sharing of the processor by multiple programs or processes.

An operating system (OS) executing on the processor implements the virtual memory system by creating and maintaining in system memory page tables (a.k.a., translation tables) in a paged virtual memory system. The page tables map virtual addresses to physical addresses of system memory coupled to the processor. The page tables may be in the form of a hierarchy of tables, some of which map virtual addresses to intermediate table addresses. When a program accesses memory using a virtual address, the page tables are accessed in sequential order to accomplish the translation of the virtual address to its physical address, commonly referred to as a page table walk, or "tablewalk." A tablewalk involves numerous accesses of external system memory and can often be a time-consuming process that reduces processor performance.

The processor may include at least one translation lookaside buffer (TLB). A TLB is a hardware structure of a processor that caches the virtual to physical address translations in order to greatly reduce the likelihood of the need for a tablewalk. The TLB compares the virtual address to be translated to previously stored virtual addresses in the TLB and if it hits in the TLB (e.g., when a virtual address match is found), the TLB provides the corresponding physical address. Retrieving the physical address from the TLB consumes much less time than would be required to access the page tables in system memory to perform the tablewalk.

The processor may also support one or more paging caches that cache information for one or more of the page tables. For example, chapter 4 of the Intel® 64 and IA-32 Architectures Software Developer's Manual, Volume 3C: System Programming Guide, January 2015 (referred to herein as the "Intel® system programming guide"), which is hereby incorporated by reference in its entirety for all intents and purposes, describes an IA-32e paging mode. The IA-32e paging mode includes a level 4 page map table (PML4), a page directory pointer table (PDPT), a page directory (PD), and a page table (PT), all located in the system memory. The processor may include a separate paging cache for each page table. A hit in a paging cache enables bypassing of one or more of the page tables in the system memory to reduce the number of system memory accesses. In this manner, the tablewalk process may be significantly accelerated when there is a hit within a paging cache.

It is often desired or even necessary to invalidate TLB and/or paging cache entries. If the processor attempts to use an invalid translation that is otherwise marked as valid, an error occurs which may result in improper operation. Chapter 2 of the Intel® system programming guide describes an x86 instruction set architecture (ISA) instruction "INVLPG" that is intended to invalidate a TLB entry for a specified page. A conventional x86 processor responds to the INVLPG instruction by executing an invalidate page microcode routine. The conventional invalidate page microcode routine manually accessed and searched each TLB and paging cache entry, one at a time, and invalidated any matching entries. The conventional microcode invalidation routine was a complex operation that consumed valuable processor time and resources.

SUMMARY OF THE INVENTION

A processor according to one embodiment includes a translation lookaside buffer (TLB), an instruction translator, and a memory subsystem. The TLB caches virtual to physical address translations. The instruction translator incorporates a microinstruction set of a microarchitecture of the processor that includes a single invalidate page instruction. The invalidate page instruction, when executed by the processor along with a specified virtual address, causes the processor to perform a pseudo translation process in which the virtual address is submitted to the TLB to identify matching entries in the TLB that match the virtual address. The memory subsystem invalidates the matching entries in the TLB.

The TLB may include a data TLB and an instruction TLB, in which matching entries are invalided in both. A snoop request may be submitted to the instruction TLB, which identifies matching entries. A hit memory or the like may be used to temporarily store matching entries. The memory subsystem may include a tablewalk engine that performs a pseudo tablewalk and that invalidates matching entries. The processor may include at least one paging cache, in which the tablewalk engine further invalidates matching entries within each paging cache.

The entries may indicate local or global pages. The single invalidate page instruction may be of a type that invalidates only local pages. In this case, the memory subsystem and/or the tablewalk engine invalidates only those matching entries that are indicated or identified as being local.

A method of operating a processor according to one embodiment includes defining a single invalidate page instruction in a microinstruction set of a microarchitecture of the processor, storing virtual to physical address translations within a translation lookaside buffer (TLB) of the processor, specifying a virtual address, causing the processor to perform a pseudo translation process including submitting the virtual address to the TLB upon execution of the invalidate page instruction, identifying matching entries that match the virtual address by the TLB responsive to the pseudo translation process, and during the pseudo translation process, invalidating only those entries of the TLB that are identified as matching entries.

The method may include defining a single invalidate local page instruction, and invalidating only those matching entries of the TLB that are identified as local entries. The method may include storing the matching entries in a hit memory. The method may include sending a snoop request to an instruction TLB along with the virtual address. The method may include storing, by the instruction TLB, matching entries within a hit memory. The method may include pushing a tablewalk into a tablewalk engine, and performing, by the tablewalk engine, a pseudo tablewalk that submits the virtual address to the TLB and that invalidates matching entries within the TLB.

The method may include pushing a tablewalk into a tablewalk engine, performing, by the tablewalk engine, a pseudo tablewalk that submits the virtual address to a paging cache, the paging cache, responsive to the pseudo tablewalk, identifying matching entries within the paging cache that match the virtual address, and invalidating, by the tablewalk engine, the matching entries within the paging cache. The method may include storing, by the paging cache, the matching entries into a hit memory. The method may include defining a single invalidate local page instruction, and invalidating, by the tablewalk engine, only the matching entries within the paging cache that are identified as local entries.

DETAILED DESCRIPTION

A processor as described herein includes a single invalidate page instruction (or microinstruction or micro-operation) that replaces the complex conventional invalidate page microcode routine. The processor includes an instruction translator that incorporates a microinstruction set of a microarchitecture of the processor, in which the microinstruction set includes the new invalidate page instruction. The new invalidate page (INVLPGC) instruction and a corresponding virtual address are issued into the pipeline structure of the memory subsystem of the processor in a similar manner as a standard load or store instruction. The normal translation process used for normal instructions is replaced by a pseudo translation process for the INVLPGC instruction. The pseudo translation process is substantially similar to the normal translation process except that the system memory is not accessed. The normal searching functions of the TLB and caching structures employed for address translation are leveraged by the pseudo translation process to identify matching entries, which are then stored. The matching entries are then invalidated to complete the INVLPGC instruction.

Figure 1:
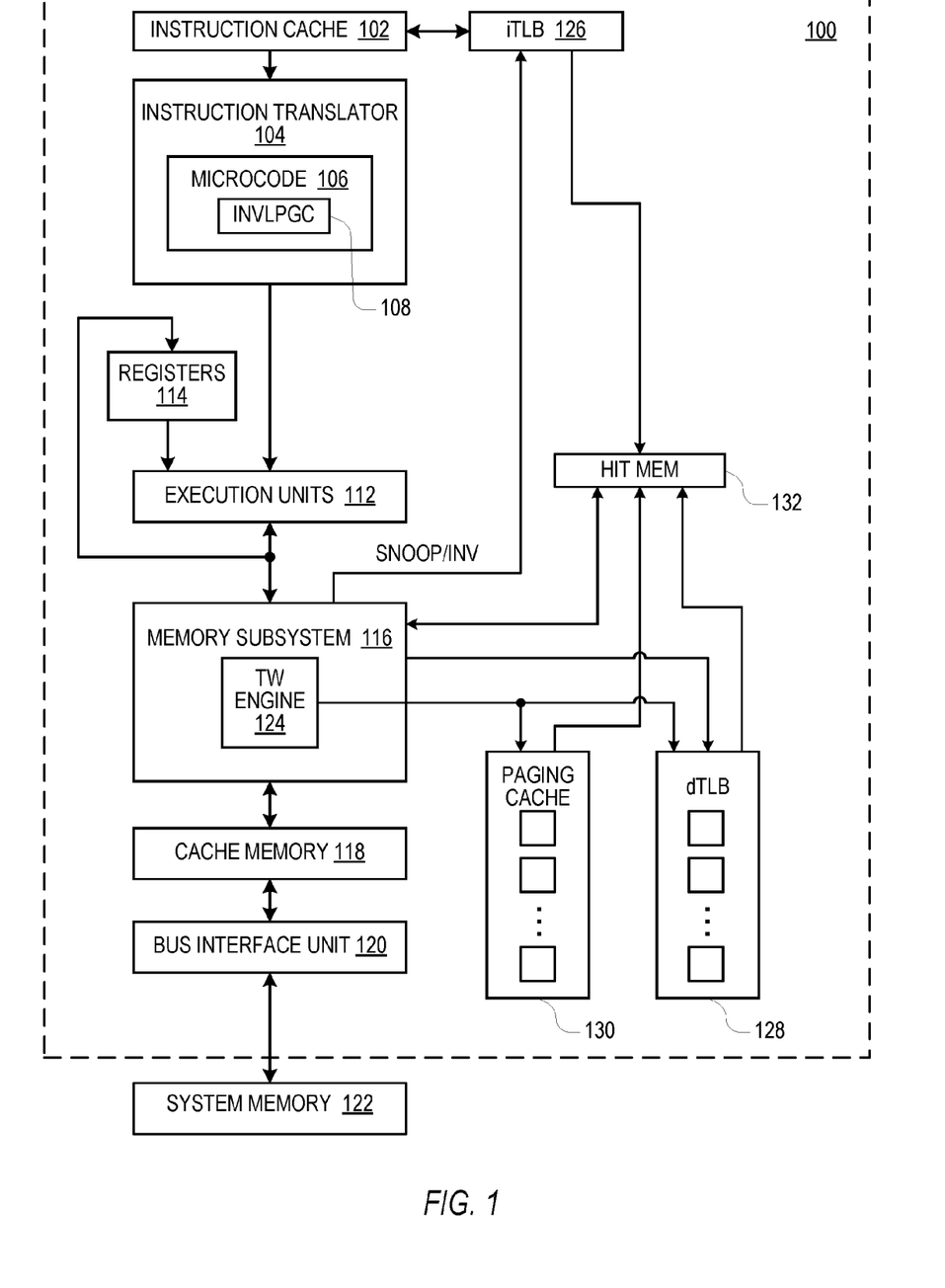
FIG. 1 is a block diagram of a processor that incorporates a single invalidate page (INVLPGC) instruction implemented according to one embodiment of the present invention.

FIG. 1 is a block diagram of a processor 100 that incorporates a single invalidate page (INVLPGC) instruction 108 implemented according to one embodiment of the present invention. The processor 100 includes an instruction cache 102, an instruction translator 104, execution units 112, architectural registers 114, a memory subsystem 116, a cache memory 118 (including one or more cache memories) and a bus interface unit 120. The bus interface unit 120 interfaces the processor 100 to external system memory 122. The instruction translator 104 may include a microcode unit 106 that includes the INVLPGC instruction 108 as further described herein. Other functional units (not shown) may include branch predictors, a reorder unit, a reorder buffer, reservations stations, an instruction scheduler, and data prefetch units, among other possible functional units.

In one embodiment, the microprocessor 100 has an out-of-order execution microarchitecture in which instructions may be issued for execution out of program order. In one embodiment, the microprocessor 100 has a superscalar microarchitecture that is capable of issuing multiple instructions per clock cycle to the execution units 112 for execution. In one embodiment, the microprocessor 100 conforms substantially to the x86 instruction set architecture (ISA). It is appreciated, however, that other ISAs are contemplated in which the present invention is not limited to the x86 ISA.

The instruction cache 102 caches architectural instructions fetched from the system memory 122. The processor 100 further includes an instruction translation lookaside buffer (iTLB) 126 that interfaces the instruction cache 102 for caching address translations for instructions fetched from the system memory 122. The iTLB 126 thus serves to reduce system memory 122 accesses for fetching instructions. In one embodiment, the instruction translator 104 translates the architectural instructions fetched from the instruction cache 102, which may be referred to as "macroinstructions," into microinstructions of a microinstruction set of the microarchitecture of the processor 100. The execution units 112 execute the microinstructions to perform the functions intended by the set of architectural instructions. The INVLPGC instruction 108 as described herein may be a microinstruction included in the microinstruction set of the processor 100. In general, however, the microinstructions may generally be referred to herein simply as "instructions." The INVLPGC instruction 108 is a single microinstruction that performs the complex page invalidation functions intended to be performed for the x86 INVLPG macroinstruction.

The execution units 112 receive source operands from the architectural registers 114 (or perhaps from a reorder buffer or a forwarding bus, not shown). Operands are loaded into the registers 114 from the system memory 122 via the memory subsystem 116. The memory subsystem 116 writes data to and reads data from the cache memory 118. The cache memory 118 may be implemented with multiple caches organized according to a cache memory hierarchy, e.g., level-1 (L1) data cache, level-2 (L2) cache, level-3 (L3) cache, etc. If a cache miss occurs to the last level cache of the cache memory 118, the data or instruction cache line is requested from the bus interface unit 120, which fetches the cache line from the system memory 122.

At least one data translation lookaside buffer (dTLB) is included interfacing the memory subsystem 116. The dTLB 128 may be implemented as a single cache or as multiple caches in hierarchical form based on page size as further described herein. The dTLB 128 caches virtual address to physical address translations in order to reduce the likelihood of the need for a tablewalk. The dTLB 128 compares a virtual address provided by the memory subsystem 116 to previously stored virtual addresses stored in the dTLB 128. During normal operation, if the provided virtual address matches any of the stored virtual addresses, a "hit" occurs and the dTLB 128 provides the corresponding physical address to avoid the need for a tablewalk. Otherwise, a "miss" in the dTLB 128 causes a tablewalk to be performed to retrieve the physical address from the system memory 122. Retrieving the physical address from the dTLB 128 is significantly faster than performing a tablewalk to retrieve the physical address from the system memory 122.

The memory subsystem 116 includes a tablewalk (TW) engine 124 that performs address translation tablewalks to generate virtual to physical address translations when there is no match in the dTLB 128. During normal address translation operation, the TW engine 124 accesses page tables (e.g., see FIG. 2) in the system memory 122 to perform each tablewalk to generate a virtual to physical address translation, which is subsequently loaded into the dTLB 128. The page tables may include tables that map a page (e.g., x86 ISA page tables) or that reference other translation tables (e.g., x86 ISA page directories, page-directory-pointer tables, PML4 tables) in a translation table hierarchy.

The processor 100 includes at least one paging cache in a paging cache structure 130 that caches translation information of one or more of the page tables. During normal operation of a tablewalk, the TW engine 124 submits the virtual address to the paging caches in the paging cache structure 130 to search for matching entries. When a match occurs in the paging cache structure 130, translation information is retrieved from the paging cache structure 130 to avoid accessing one or more of the page tables to reduce system memory 122 accesses. Reducing system memory 122 accesses improves performance by accelerating the tablewalk process.

The microcode unit 106 may include a microcode memory (e.g., read-only memory or ROM) configured to store microcode, or microcode routines, and a microsequencer (not shown) for fetching from the microcode memory instructions of the microcode. In one embodiment, the microcode instructions are microinstructions; in another embodiment the microcode instructions are translated into microinstructions. The microcode implements some of the architectural instructions, such as particularly complex architectural instructions. The microcode may include microcode routines or the like for performing various functions of the processor 100. In the illustrated configuration, the microinstructions include the single INVLPGC instruction 108, which is used to invalidate matching entries within the iTLB 126, the dTLB 128 and the paging cache structure 130. The INVLPGC instruction 108 specifies a virtual address, and any entries within the iTLB 126, the dTLB 128 and the paging cache structure 130 that match the specified virtual address are invalidated.

In one embodiment, the size and/or configuration of the iTLB 126 and the dTLB 128 depends upon the specified page size. When the page size is specified as 4 kilobytes (KB), for example, then the dTLB 128 may be configured as a single TLB or as a hierarchy of multiple TLBs. In the hierarchical configuration, the dTLB 128 may include a first level (L1) TLB that is relatively small and fast, and a second level (L2) TLB that is larger yet somewhat slower than L1 TLB. In one embodiment, an intermediate overflow cache (e.g., L1.5) may also be provided and logically positioned between the L1 and L2 TLBs. The iTLB 126 may be configured similarly to the L1 TLB, in which the iTLB 126 and the L1 TLB of the dTLB 128 each send "victims" replaced by new entries into the overflow TLB, if provided, and/or then into the L2 TLB according to the implemented replacement algorithm. When other page sizes are specified, such as 2 megabyte (MB) pages, 4 MB pages, 1 gigabyte (GB) pages, etc., then the iTLB 126 and the dTLB 128 may each be configured as separate, larger TLB structures based on the specified page size. Of course, hierarchy TLB configurations may be defined for larger page sizes if desired.

The paging cache structure 130 includes a separate paging cache for one or more page tables defined for the particular address translation scheme or paging mode that is being used as further described herein. In the illustrated configuration, a hit memory 132 is provided for storing hit information from the iTLB 126, the dTLB 128 and the paging cache structure 130. In other configurations, the hit memory 132 may be distributed as local memories that are located at or near the separate search functions.

Prior to addressing operation of the INVLPGC instruction 108, the process of address translation during normal operation is now briefly described. A microinstruction is provided to the memory subsystem 116 with a corresponding virtual address for accessing a corresponding page in the system memory 122. The microinstruction may be, for example, a load (LD) instruction to load data into a memory location of a page identified by the virtual address, or a store (ST) instruction to retrieve data from the memory location. As previously described, the processor 100 operates using a paged virtual memory system in which the virtual address is not used directly for accessing the memory page. Instead, the virtual address is first converted to the corresponding physical address using address translation.

According to a simplified address translation process, the memory subsystem 116 first provides the virtual address to the dTLB 128, which compares the provided virtual address with the virtual address of the stored entries of the dTLB 128. In the event of a hit (when a virtual address match is found), the corresponding stored physical address is retrieved and provided back to the memory subsystem 116 and address translation is completed. In the event of a miss (no matching entries found in the dTLB 128), then a tablewalk is "pushed" into the TW engine 124 which performs the tablewalk process to retrieve the physical address. Once the tablewalk process is completed, the TW engine 124 updates the dTLB 128 with the new address translation. The paging cache structure 130 may also be updated with the new address translation.

During the normal tablewalk process, the TW engine 124 accesses page tables in the system memory 122 in sequential order to retrieve the physical address. The TW engine 124 may also access one or more paging caches in the paging cache structure 130. If a hit occurs in the paging cache structure 130, the corresponding address information is retrieved and used to bypass one or more of the page tables to accelerate the tablewalk process. If the tablewalk misses in the paging cache structure 130, then the full tablewalk is performed to access the physical address, and the paging cache structure 130 is updated with the new address translation information.

The address translation process may be somewhat modified to improve performance and to meet specified timing criteria. For example, the tablewalk may be pushed early rather than waiting for the dTLB 128 search to complete. If a hit occurs in the dTLB 128 after a tablewalk is pushed, then the tablewalk is terminated (if already initiated), or canceled (if queued and not yet started). In one embodiment, for example, the dTLB 128 search and the tablewalk may be initiated at the same time. In another embodiment, such as when the dTLB 128 is implemented with a hierarchy of multiple TLBs, the virtual address is first applied to the L1 TLB (and the overflow TLB, if provided) of the dTLB 128, and in the event of a miss, the tablewalk is then pushed while the virtual address is provided to the L2 cache of the dTLB 128. The tablewalk is terminated or canceled in the event of a hit in the L2 TLB. Otherwise, the tablewalk completes to determine the physical address.

An entry in the dTLB 128 and/or the paging cache structure 130 may need to be invalidated for various reasons. As previously described, the x86 INVLPG macroinstruction may be issued to invalidate a TLB entry for a page specified by a virtual address. The x86 INVLPG instruction, however, is a macroinstruction provided in software or code in the system memory 122 and issued through the instruction cache 102. In the conventional processor configuration, the INVLPG macroinstruction was trapped to a microcode invalidation routine of the microcode 106. The conventional microcode invalidation routine manually accessed and searched each entry of the dTLB 128 one at a time, and invalidated any matching entries. The conventional microcode invalidation routine, therefore, was a complex operation that consumed valuable processor time and resources.

The conventional microcode invalidation routine did not, however, search the paging cache structure 130. Instead, the entire paging cache structure 130 was flushed or otherwise invalidated with the resultant loss of potentially valuable translation information.

As further described herein, the INVLPGC instruction 108 is a single microinstruction that effectuates the same functions as the conventional complex page invalidation task regardless of the multiple page sizes and hierarchies of the dTLB 128. The memory subsystem 116 responds to the INVLPGC instruction 108 in a similar manner as a normal microinstruction providing a virtual address for address translation. Instead of the normal translation process, however, the memory subsystem 116 performs a "pseudo" translation process. According to the pseudo translation process, the virtual address is provided to the dTLB 128 to perform an address translation search in a substantially similar manner as a normal address translation search. A hit in the dTLB 128, however, does not terminate the search but instead the location of any one or more entries that hit are stored in the hit memory 132.

The pseudo translation process further sends a snoop to the iTLB 126 with the virtual address, in which the iTLB 126 performs a search for any matching entries. Any hits in the iTLB 126 are also stored in the hit memory 132. A miss in the iTLB 126, however, does not result in an access to the system memory 122. Instead, according to the pseudo translation process, the search in response to the snoop function is simply terminated after searching is complete. In this manner, the normal search functions of the iTLB 126 are leveraged for finding matching entries without accessing the system memory 122, and any matching entries are stored in the hit memory 132.

Furthermore, a pseudo tablewalk is pushed into the TW engine 124 using the provided virtual address regardless of whether there is a hit in the dTLB 128. A "pseudo" tablewalk means that the tablewalk searching functions are performed substantially the same as a normal tablewalk, except that the system memory 122 is not accessed. Also, the pseudo tablewalk process is initiated in response to the INVLPGC instruction 108 regardless of whether there is a hit in the dTLB 128, and is not terminated or canceled until searching is completed. The TW engine 124 performs the pseudo tablewalk in substantially similar manner as a normal tablewalk, except that the page tables in the system memory 122 are not accessed. In particular, the TW engine 124 provides the virtual address to each individual paging cache within the paging cache structure 130 for searching the entries therein. In a similar manner as with the dTLB 128, any hits do not terminate the search process and the location of any one or more matching entries are stored in the hit memory 132. In this manner, the normal search functions of the dTLB 128 and the paging cache structure 130 are leveraged for finding matching entries without accessing the system memory 122, and any matching entries are stored in the hit memory 132.

Although only up to one entry should theoretically match at any given time for any one of the iTLB 126, the dTLB 128 and/or the paging cache structure 130, it is possible for more than one entry to match within each cache structure. For example, a software program may improperly modify page mappings. Even if certain such modifications are considered "illegal," they are nonetheless possible. Furthermore, existing entries may not be properly flushed or invalidated, so that over time, multiple matching entries may exist in a given TLB or paging cache. Any and all such matching entries are discovered and stored in the hit memory 132.

Once the search process is complete for the iTLB 126, the dTLB 128 and the paging cache structure 130 in response to the INVLPGC instruction 108, each matching entry in the iTLB 126, in each individual TLB of the dTLB 128, and in each individual paging cache of the paging cache structure 130 that are listed in the hit memory 132 are invalidated.

Figure 2:
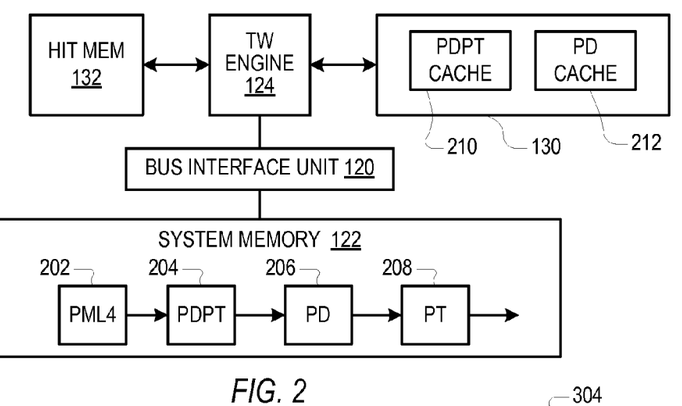
FIG. 2 is a simplified block diagram illustrating page tables and corresponding paging caches of the processor of FIG. 1 according to one embodiment that may be used for the IA-32e paging mode described in the Intel® system programming guide.

FIG. 2 is a simplified block diagram illustrating page tables and corresponding paging caches of the processor 100 according to one embodiment that may be used for the IA-32e paging mode described in the Intel® system programming guide. Although the IA-32e paging mode is shown for purposes of illustration, the INVLPGC instruction 108 is equally applicable to invalidating the paging caches used for any other paging mode. As shown, the TW engine 124 interfaces the system memory 122 via the bus interface unit 120, the paging cache structure 130, and the hit memory 132. According to the IA-32e paging mode, the processor 100 stores a level 4 page map table (PML4) 202, a page directory pointer table (PDPT) 204, a page directory (PD) 206, and a page table (PT) 208 in the system memory 122. It is appreciated that the page tables 202, 204, 206 and 208 (202-208) are specific to the IA-32e paging mode, such that alternative page tables may be defined for different paging modes as understood by those of ordinary skill in the art. The paging cache structure 130 may include a separate paging cache for each of the page tables 202-208. It has been determined, however, that a paging cache for the page table PML4 202 and the page table PT 208 may not provide the significant timing advantages.

In the illustrated configuration, the paging cache structure 130 includes a PDPT cache 210 and a PD cache 212. A hit in the PDTP cache 210 enables the TW engine 124 to bypass system memory 122 accesses for the PML4 page table 202 and the PDPT page table 204 and to instead directly access the PD page table 206. In particular, the PDPT cache 210 compares an upper portion of the provided virtual address down to the next page table PD 206 with the corresponding upper portion of virtual addresses stored in the PDPT cache 210. When a hit occurs, the PDPT cache 210 retrieves the corresponding physical address which points to the next page table, which is the PD page table 206. In this manner, the page tables 202 and 204 are bypassed.

In a similar manner, each entry of the PD cache 212 stores corresponding upper portions of virtual addresses down to the PT page table 208, so that a hit within the PD cache 212 provides a physical address that may be used to directly access the PT page cache 208. In this manner, a hit within the PD cache 212 enables the TW engine 124 to bypass system memory 122 accesses for the PML4 page table 202, the PDPT page table 204 and the PD page table 206, and instead to directly access the next page table, which is the PT page table 208.

It is appreciated that hits in any of the paging caches of the paging cache structure 130 accelerates the tablewalk process by reducing the number of system memory 122 accesses. During the pseudo tablewalk, the paging cache structure 130 finds any one or more of such matching entries and the entry locations are stored in the hit memory 132. The pseudo tablewalk, however, does not access the system memory 132.

Figure 3:
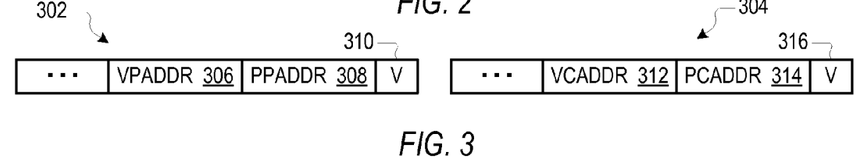
FIG. 3 is a diagram illustrating a TLB entry for both the iTLB and the dTLB of the processor of FIG. 1, and illustrating a PC entry of the paging cache structure of the processor of FIG. 1.

FIG. 3 is a diagram illustrating a TLB entry 302 for both the iTLB 126 and the dTLB 128, and a PC entry 304 of the paging cache structure 130. The TLB entry 302 represents the entries for both the iTLB 126 and the dTLB 128, although different fields may be included and field sizes may vary. Each of the entries 302 and 304 include multiple fields in which each field includes one or more bits of the corresponding entry for holding a corresponding value. The TLB entry 302 includes a field storing a virtual page address VPADDR 306, another field storing a corresponding physical page address (PPADDR) 308, and another field storing a valid (V) value 310. Other fields may be included but are not shown since not necessary for a full and complete understanding of the present invention. For example, each of the entries 302 and 304 may include status bits that contain the properties of the corresponding page. The VPADDR 306 and the PPADDR 308 may collectively be referred to as the address translation of the TLB entry 302. A "page" address includes the upper bits of a corresponding address suitable for defining a page of information. As an example, if a full address includes 48 bits [47:0] and a page size is 4 KB, then the page addresses VPADDR 306 and PPADDR 308 each include the upper 36 bits [47:12] in which the lowest 12 bits are omitted. The number of bits of the page address varies with the size of the full address and the page size. The V value 310 determines whether the TLB entry 302 is valid or not, and may include one or more bits.

The PC entry 304 is similar to the TLB entry 302 and includes similar values in similar fields. The PC entry 304 includes a field storing a virtual cache address VCADDR 312, another field storing a corresponding physical cache address (PCADDR) 314, and another field storing a valid (V) value 316. Again, other fields may be included but are not shown since not necessary for a full and complete understanding of the present invention. In this context, a "cache" address includes the upper bits of a corresponding address for pointing to a next page table of the page tables 202-208 in order to bypass the previous page tables. The size of the cache address depends not only on the size of the full address, but also depends on the particular paging cache in which the entry resides. Each entry of the PDPT cache 210 includes all of the upper bits of each address suitable for pointing to the next PD page table 206 in order to bypass the PML3 and PDPT page tables 202 and 204. Each entry of the PD cache 212 includes all of the upper bits of each address suitable for pointing to the next PT page table 208 in order to bypass the PML3, PDPT and PD page tables 202, 204 and 206. For example, assuming a 48-bit address, the cache addresses VCADDR 312 and PCADDR 314 of a PC entry 304 for the PDPT cache 210 may include the upper 18 bits [47:30] for pointing to the PD page table 206, and the cache addresses VCADDR 312 and PCADDR 314 of a PC entry 304 for the PC cache 212 may include the upper 27 bits [47:21] for pointing to the PT page table 208. The V value 316 determines whether the PC entry 304 is valid or not, and may include one or more bits.

Figure 4:
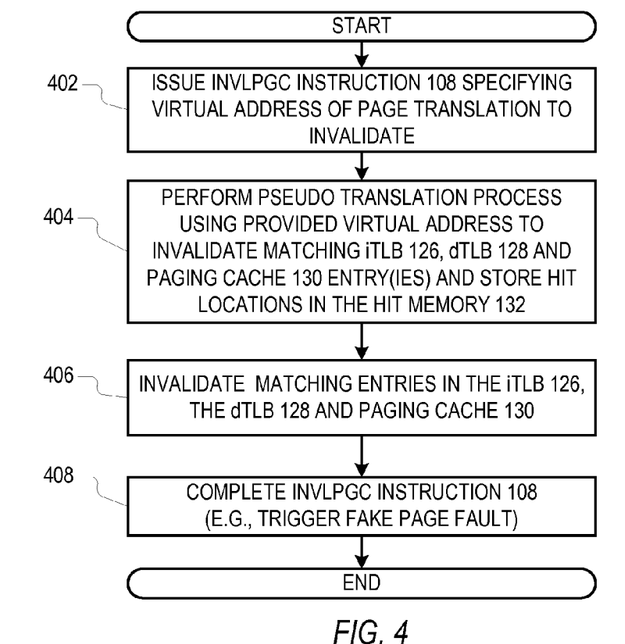
FIG. 4 is a flowchart diagram illustrating operation of the processor of FIG. 1 when processing the INVLPGC instruction for invalidating entries of the iTLB, the dTLB and the paging cache structure of the processor of FIG. 1.

FIG. 4 is a flowchart diagram illustrating operation of the processor 100 when processing the INVLPGC instruction 108 for invalidating entries of the iTLB 126, the dTLB 128 and the paging cache structure 130. At first block 402, the INVLPGC instruction 108 is issued from the microcode 106 in response to the architectural INVLPG macroinstruction, or otherwise in response to any other instruction or operation indicating that a given page entry should be invalidated. The INVLPGC instruction 108 specifies the virtual address of the page translation for invalidation. At next block 404, the pseudo translation process is performed using the provided virtual address to invalidate one or more matching entries of the iTLB 126, the dTLB 128 and the paging cache structure 130, and any hit locations are stored in the hit memory 132. The pseudo translation process is described further herein. At next block 406, the matching entries in the iTLB 126, the dTLB 128 (and each TLB within) and the paging cache structure 130 (and each paging cache within) are invalidated. This may be performed by clearing the valid values 310 or 316 of the matching entries. At next block 408, the INVLPGC instruction 108 is completed.

The actual process of storing matching entries in the hit memory 132 denoted at block 404 and invalidating the matching entries denoted at block 406 may depend upon the particular processor configuration. Although the hit memory 132 is illustrated at a central location, the memory 132 may instead be distributed as local memory locations. Also, the entity performing invalidation may be a separate logic block or circuit provided within the memory subsystem 116, or may be performed by the TW engine 124 and circuitry of the iTLB 126.

In one embodiment, for example, the TW engine 124 is configured to update the dTLB 128 upon completion of a normal tablewalk operation. Also during the normal operation, the TW engine 124 locally stores the location to be updated along with other information for performing TLB replacement according to a replacement policy. In one embodiment, the dTLB 128 is a set-associative cache and each set of the dTLB 128 includes replacement information, such as least recently used (LRU) or pseudo-LRU information, and the memory subsystem 122 selects for replacement an entry of the indexed set indicated by the replacement information. For the pseudo translation process, the TW engine 124 may store the one or more hit locations in a local memory within the TW engine 124 representing a portion of the hit memory 132. Rather than replacing an entry within the dTLB 128 according to the normal tablewalk process, the matching locations are invalidated such as by clearing the corresponding valid value 310.

In one embodiment as shown in FIG. 1, a SNOOP request is sent to the iTLB 126 that includes the corresponding virtual address according to the pseudo translation process, and the iTLB 126 searches and stores one or more locations in the hit memory 132. The iTLB 126 may also store hits in a local memory which represents a distributed portion of the hit memory 132. A miss in the iTLB 126 terminates the SNOOP request and the system memory 122 is not accessed. Furthermore, an invalidate (INV) request is sent to the iTLB 126, which invalidates each of the stored hits. If there are no matching entries in the hit memory 132, then the INV request also simply terminates.

In one embodiment, the INVLPGC instruction 108 is self-serializing in that page invalidation occurs whenever it is executed. It is possible to wait in the TW engine 124 until the INVLPGC instruction 108 is no longer speculative and then invalidate. The INVLPGC instruction 108, however, should not be executed speculatively. In a normal tablewalk process, an update to the dTLB 128 caused a normal exit from the TW engine 124. In one embodiment, since the dTLB 128 is not updated with a new value for the pseudo tablewalk process, a fake page fault may be triggered to cleanly exit from the TW engine 124. The triggering of a fake page fault is a convenient termination mechanism that is implementation specific. Alternative methods for exiting the TW engine 124 may be used for alternative configurations.

Figure 5:
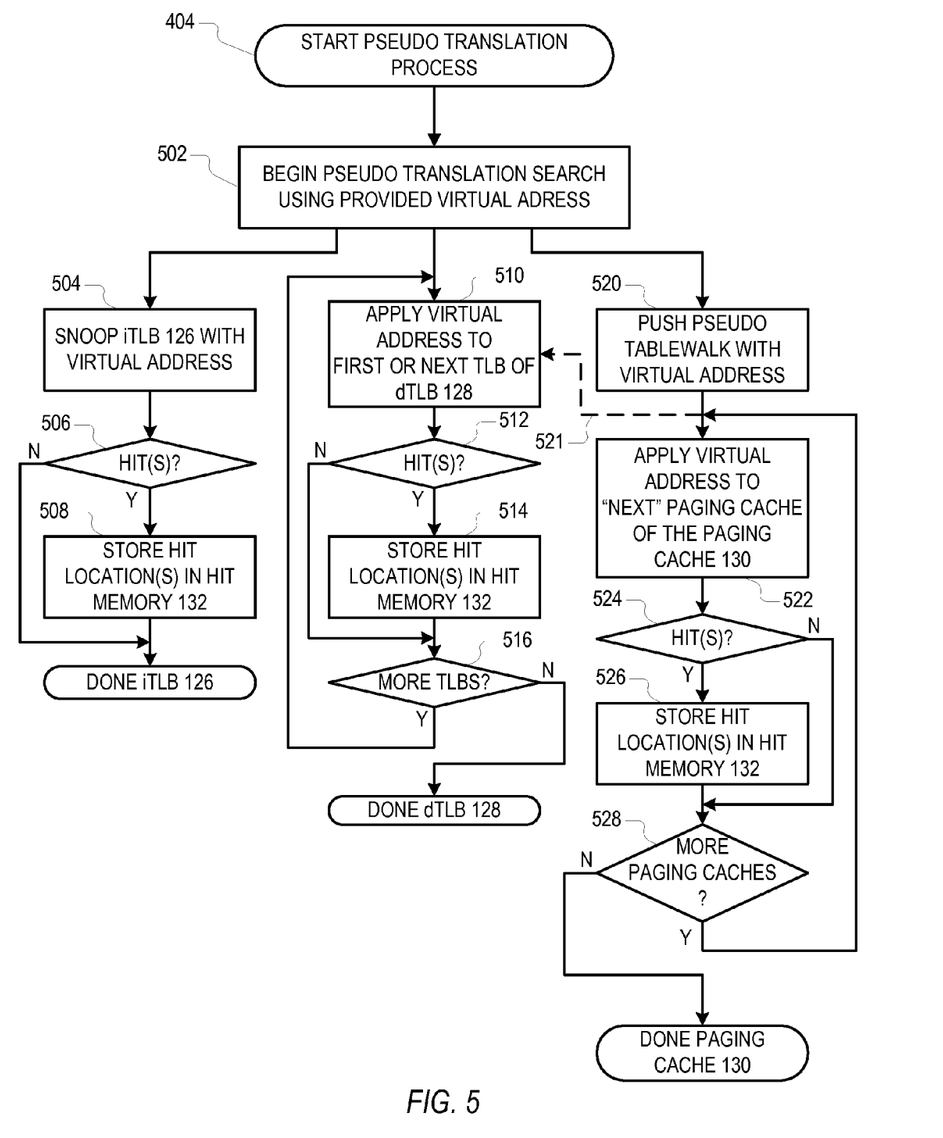
FIG. 5 is a flowchart diagram illustrating operation of the pseudo translation process of FIG. 4 in more detail.

FIG. 5 is a flowchart diagram illustrating operation of the pseudo translation process of block 404 in more detail. When invoked, operation proceeds to block 502 in which the pseudo translation search process is initiated using the provided virtual address. Operation then proceeds to block 504 for the iTLB 126, to block 510 for the dTLB 128, and/or to block 520 for the paging cache structure 130. In one embodiment, any one or more of these pseudo translation search processes may be initiated in parallel and/or performed substantially in parallel. Alternatively, each separate process may be initiated sequentially in any desired order. Alternatively, the separate processes may be performed serially or sequentially at the expense of performance.

At block 504, a snoop of the iTLB 126 is performed using the virtual address. At next block 506, it is queried whether there are any hits in the iTLB 126. If so, then operation proceeds to block 508 in which any hit locations are stored in the hit memory 132. After storing hits in the hit memory 132, or if there are no hits in the idTLB 128, then the iTLB 126 search is done. As previously described, the snoop may be initiated by sending a SNOOP request to the iTLB 126, and the iTLB 126 searches its entries for any matches with the provided virtual address.

At block 510, the virtual address is applied to the first or next TLB of the dTLB 128, which is the first TLB for the first iteration and is the next TLB for each subsequent iteration. Also, the "first or next" TLB may be the only TLB depending upon the paging mode. The dTLB 128 searches for matching entries with the same virtual address, and the locations of any hits, as determined at block 512, are stored into the hit memory 132 at block 514. After storing any hits or if there are no hits, operation proceeds to block 516 in which it is queried whether there are additional TLBs. If not, operation is done for the dTLB 128. Otherwise, such as for the hierarchical configuration, operation returns to block 510 to apply the virtual address to the next TLB, and operation is repeated for each TLB within the dTLB 128.

At block 520, a pseudo tablewalk is pushed into the TW engine 124 along with the virtual address. During the pseudo tablewalk process, the virtual address is applied to the "next" paging cache within the paging cache structure 130 at block 522, which may be the first paging cache for the first iteration (and may be the only paging cache depending upon the paging mode). The paging cache determines whether there are any hits at block 524, and if so, stores them into the hit memory 132 at block 526. After storing any hits or if there are no hits, operation proceeds to block 528 in which it is queried whether there are additional paging caches. If not, operation is done for the paging cache structure 130. Otherwise, operation returns to block 522 to apply the virtual address to the next paging cache. Operation is repeated for each paging cache within the paging cache structure 130.

The virtual address may be applied to the first TLB of the dTLB 128 at the same time that the SNOOP request is sent to the iTLB structure 126, in which the iTLB and TLB structures 126 and 128 may be searched simultaneously. The tablewalk may also be pushed into the TW engine 124 at the same time, in which the paging cache structure 130 may also be searched in parallel with the TLBs. Alternatively, in accordance with normal operation for a hierarchical configuration, the virtual address may be applied to the first L1 TLB, and possibly to the overflow TLB if provided, before the tablewalk is pushed. Then the TW engine 124 is pushed to search additional TLBs, such as the L2 TLB, while the tablewalk process is also initiated for searching the paging cache structure 130. Flow line 521 is added to illustrate the process of the TW engine 124 initiating the search of the larger TLBs within the dTLB 128.

As previously noted, the conventional microcode invalidation routine flushed or otherwise invalidated with the resultant loss of potentially valuable translation information. The pseudo translation process as described herein, however, provides the distinct advantage of invalidating only the matching entries in the paging cache structure 130 rather than invalidating the paging cache structure 130 in its entirety. Nonetheless, this difference may result in compatibility issues with conventional x86 processors. In another embodiment, the INVLPGC instruction 108 invalidates the entire paging cache structure 130 to ensure compatible operation with conventional x86 processors. In yet another embodiment, a separate clear instruction may be issued after the INVLPGC instruction 108 to specifically invalidate the entire paging cache structure 130 to ensure compatible operation.

In one embodiment, the INVLPGC instruction 108 invalidates each matching entry including matching both local and global valid entries. A page may be marked or tagged as a local page or a global page. A local page is specific to only one process, whereas a global page may be used by multiple processes. The INVLPGC instruction 108 may have multiple variations including a first variation that invalidates both local and global matching entries, and a second variation that invalidates only matching local entries (in which the global matching entries are not invalidated). For the second variation, the memory subsystem 116 and/or the TW engine 124 is further configured to invalidate only those matching entries in which a global valid (e.g., at least one global bit) is not set. Block 406 includes the function of checking the global value, and to invalidate only those matching entries that are not indicated as being global pages.

Although an embodiment has been described with respect to the x86 ISA, the single invalidate page instruction or similar form may be employed in other ISAs, such as the ARM, MIPS or Sun ISAs. The single invalidate page instruction as described herein may be used in any ISA that supports a virtualization scheme. It is also apparent to persons skilled in the relevant computer arts that various changes in form and detail can be made therein without departing from the scope of the invention. Embodiments of the apparatus and method described herein may be included in a semiconductor intellectual property core, such as a microprocessor core (e.g., embodied, or specified, in a HDL) and transformed to hardware in the production of integrated circuits. Thus, the present invention should not be limited by any of the exemplary embodiments described herein, but should be defined only in accordance with the following claims and their equivalents. Specifically, the present invention may be implemented within a microprocessor device that may be used in a general-purpose computer. Finally, those skilled in the art should appreciate that they can readily use the disclosed conception and specific embodiments as a basis for designing or modifying other structures for carrying out the same purposes of the present invention without departing from the scope of the invention as defined by the appended claims.

The invention claimed is:

1. A processor, comprising:
a translation lookaside buffer (TLB) that caches virtual to physical address translations;
at least one paging cache that caches address translations of at least one page table stored in an external memory;
an instruction translator that incorporates a microinstruction set of a microarchitecture of the processor, wherein said microinstruction set includes a single invalidate page instruction, wherein said invalidate page instruction, when executed by the processor along with a specified virtual address, causes the processor to perform a pseudo translation process in which said virtual address is submitted to said TLB to identify all matching entries in said TLB that match said virtual address; and
a memory subsystem that invalidates said matching entries in said TLB, and wherein said memory subsystem further comprises a tablewalk engine, wherein said pseudo translation process causes said memory subsystem to push a pseudo tablewalk into said tablewalk engine, wherein said tablewalk engine submits said virtual address to said at least one paging cache to identify said matching entries, and wherein said tablewalk engine invalidates said matching entries within said at least one paging cache without accessing the external memory.

2. The processor of claim 1, further comprising a hit memory, wherein said TLB stores locations of said matching entries into said hit memory.

3. The processor of claim 1, wherein said TLB comprises an instruction TLB, and wherein said memory subsystem, in accordance with said pseudo translation process, submits a snoop request with said virtual address to said instruction TLB which identifies matching entries within said instruction TLB that match said virtual address.

4. The processor of claim 3, wherein said memory subsystem further submits an invalidation request to said instruction TLB that causes said instruction TLB to invalidate said matching entries.

5. The processor of claim 3, further comprising a hit memory, wherein said instruction TLB stores locations of said matching entries in said instruction TLB into said hit memory.

6. The processor of claim 1, wherein said single invalidate page instruction indicates invalidation only of local entries, and wherein said tablewalk engine invalidates only those of said matching entries that are not indicated as being global entries.

7. The processor of claim 1, wherein said single invalidate page instruction indicates invalidation only of local entries, and wherein said memory subsystem invalidates only those of said matching entries that are indicated as local entries.

8. The processor of claim 1, further comprising:
a hit memory;
said TLB comprising a data TLB and an instruction TLB;
said memory subsystem comprising a tablewalk engine;
wherein in response to said invalidate page instruction:
said memory subsystem submits said virtual address to said data TLB which stores first matching entries within said hit memory, and wherein said memory subsystem invalidates said first matching entries in said data TLB that are listed in said hit memory;
said memory subsystem sends a snoop request to said instruction TLB which stores second matching entries within said hit memory, and wherein said memory subsystem sends an invalidate request to said instruction TLB which invalidates said second matching entries in said instruction TLB that are listed in said hit memory; and
wherein said tablewalk engine performs said pseudo tablewalk by submitting said virtual address to said at least one paging cache and which stores third matching entries within said hit memory, and wherein said tablewalk engine further performs said pseudo tablewalk by invalidating said third matching entries in said paging cache that are listed in said hit memory.

9. A method of operating a processor, comprising:
defining a single invalidate page instruction in a microinstruction set of a microarchitecture of the processor;
storing virtual to physical address translations within a translation lookaside buffer (TLB) within the processor;
storing translation information of at least one page table located in an external memory into a paging cache within the processor;
specifying a virtual address;
upon execution of the invalidate page instruction, causing the processor to perform a pseudo translation process including submitting the virtual address to the TLB;
the TLB, responsive to the pseudo translation process, identifying all matching entries within the TLB that match the virtual address;
during the pseudo translation process, invalidating only those entries of the TLB that are identified as matching entries;
upon execution of the invalidate page instruction, pushing a tablewalk into a tablewalk engine within the processor;
performing, by the tablewalk engine, a pseudo tablewalk that submits the virtual address to the paging cache without accessing the external memory;
the paging cache, responsive to the pseudo tablewalk, identifying matching entries within the paging cache that match the virtual address; and
invalidating, by the tablewalk engine, the matching entries within the paging cache.

10. The method of claim 9, wherein said defining a single invalidate page instruction comprises defining a single invalidate local page instruction, and wherein said invalidating comprises invalidating only those matching entries of the TLB that are identified as local entries.

11. The method of claim 9, further comprising storing the matching entries in a hit memory.

12. The method of claim 9, wherein said submitting the virtual address to the TLB comprises sending a snoop request to an instruction TLB along with the virtual address.

13. The method of claim 12, further comprising storing, by the instruction TLB, matching entries within a hit memory.

14. The method of claim 12, further comprising sending an invalidate request to the instruction TLB to invalidate the matching entries of the instruction TLB.

15. The method of claim 9,
wherein the tablewalk engine submits the virtual address to the TLB and invalidates matching entries within the TLB.

16. The method of claim 9, further comprising storing, by the paging cache, the matching entries into a hit memory.

17. The method of claim 9, wherein said defining a single invalidate page instruction comprises defining a single invalidate local page instruction, and wherein said invalidating by the tablewalk engine comprises invalidating, by the tablewalk engine, only the matching entries within the paging cache that are identified as local entries.

\* \* \* \* \*